(12) United States Patent
Fulton

(10) Patent No.: US 7,954,093 B2
(45) Date of Patent: May 31, 2011

(54) LOAD TIME INSTRUCTION SUBSTITUTION

(75) Inventor: Mike Stephen Fulton, Maple Ridge (CA)

(73) Assignee: International Business Machines Corporation, Armonk, NY (US)

(*) Notice: Subject to any disclaimer, the term of this patent is extended or adjusted under 35 U.S.C. 154(b) by 366 days.

(21) Appl. No.: 11/855,732

(22) Filed: Sep. 14, 2007

(65) Prior Publication Data

US 2009/0077356 A1  Mar. 19, 2009

(51) Int. Cl.
*G06F 9/45* (2006.01)
*G06F 9/44* (2006.01)

(52) U.S. Cl. ........................ 717/136; 712/226
(58) Field of Classification Search .................. 712/226, 712/136
See application file for complete search history.

(56) References Cited

U.S. PATENT DOCUMENTS

| 6,397,242 | B1 * | 5/2002 | Devine et al. .............. 718/1 |
| 6,983,456 | B2 | 1/2006 | Poznanovic et al. |
| 2003/0212729 | A1 * | 11/2003 | Eberle et al. .............. 708/625 |
| 2004/0068716 | A1 | 4/2004 | Stevens |

OTHER PUBLICATIONS

Luca Barbieri, "[PATCH 1 / . . . ] i386 dynamic fixup/self modifying code", Aug. 28, 2002.*
Lo et al., "Secure object referencing for an object-oriented computing system", Proceedings—2004 International Conference on Electrical, Electronic and Computer Engineering, ICEEC'04, pp. 273-276.
Oppold et al., "A design environment for processor-like reconfigurable hardware", International Conference on Parallel Computing in Electrical Engineering: Workshop on System Design Automation, SDA, PARELEC 2004, pp. 171-176.

* cited by examiner

*Primary Examiner* — Chun-Kuan Lee
*Assistant Examiner* — Jesse R Moll
(74) *Attorney, Agent, or Firm* — Yee & Associates, P.C.; David A. Mims, Jr.

(57) ABSTRACT

A method, computer program product, and data processing system for substituting a candidate instruction in application code being loaded during load time. Responsive to identifying the candidate instruction, a determination is made whether a hardware facility of the data processing system is present to execute the candidate instruction. If the hardware facility is absent from the data processing system, the candidate instruction is substituted with a second set of instructions.

6 Claims, 5 Drawing Sheets

LOAD TIME INSTRUCTION SUBSTITUTION

RELATED APPLICATION

This application is related to patent application U.S. Ser. No. 11/855,720, entitled "Instruction Exploitation through Loader Late Fix-Up," filed Sep. 14, 2007.

BACKGROUND OF THE INVENTION

1. Field of the Invention

The present invention relates generally to an improved data processing system and in particular to a method and apparatus for substituting one set of computer instructions for a second set of computer instructions. More particularly, the present invention relates to a computer implemented method, apparatus, and a computer usable program product for substituting one set of computer instructions for a second set of computer instructions at load time.

2. Description of the Related Art

In modern data processing, a problem can arise when new software programs are written for new types of hardware. New software can include instructions that are designed for new facilities available on the new hardware. A new facility is any function, capability, or component of the piece of hardware that is new, relative to other forms of hardware currently in use. If a user attempts to implement the new software on a data processing system containing an older hardware component, then problems can arise.

Generally speaking, when a new hardware instruction is introduced, applications that are statically compiled cannot currently exploit the new instruction unless they have the prerequisite level of hardware that defines the instruction. For vendors that provide operating systems, middleware, or any other application that has to sell to a broad range of users, years of time may pass before the hardware becomes common enough that the hardware can be specified by the software vendor as "required hardware" without reducing the potential market for the software.

SUMMARY OF THE INVENTION

The illustrative embodiments provide for a method, computer program product, and data processing system for substituting a candidate instruction in a code of an application being loaded during load time. Responsive to identifying the candidate instruction, a determination is made whether a hardware facility of the data processing system is present to execute the candidate instruction. Responsive to a determination that the hardware facility is absent from the data processing system, the candidate instruction is substituted with a second set of instructions.

In one embodiment, responsive to a determination that the hardware facility is present in the data processing system, the first set of instructions is retained.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
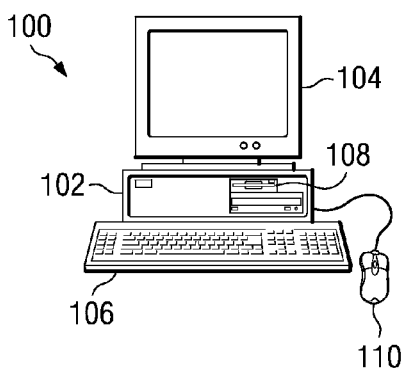
FIG. 1 shows a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
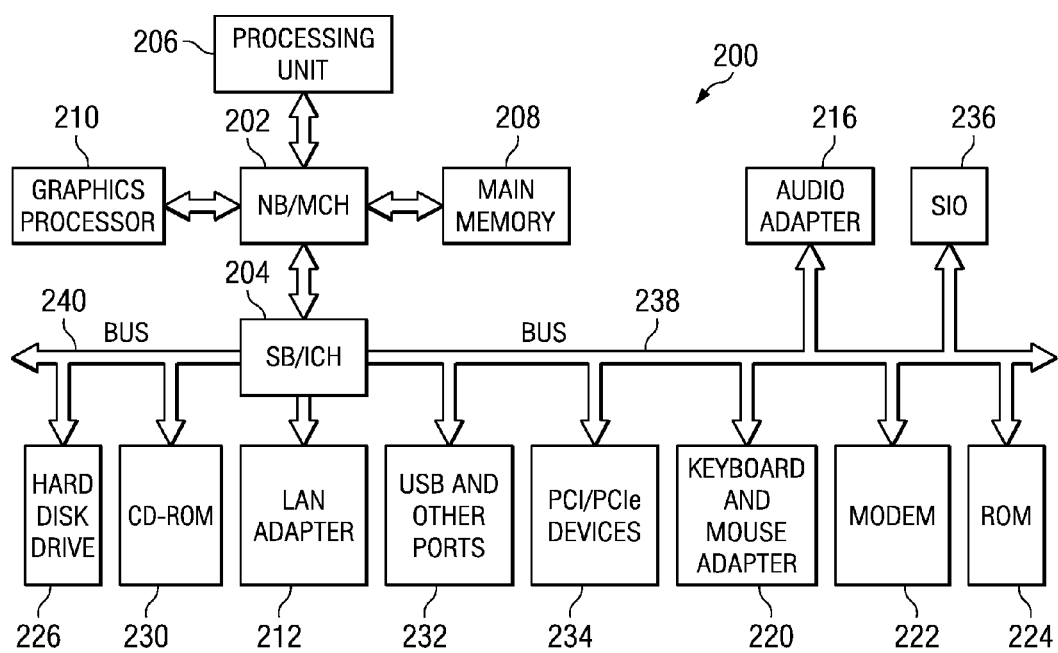
FIG. 2 shows a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows® XP. (Microsoft and Windows XP are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache, such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide for a method of replacing a candidate instruction with a second set of instructions during load time. The method includes identifying a candidate instruction in a code of an application that is being loaded during load time. The method further includes determining whether a hardware facility of the data processing system is present to execute the candidate instruction. This step is performed in response to identifying the candidate instruction. The method also includes substituting the candidate instruction with a second set of instructions. The substituting step is performed responsive to the determination that the hardware facility is absent from the data processing system.

However, if the hardware facility is present in the data processing system, then no substitution is performed. In an illustrative embodiment, each of the instructions in the substituted set of instructions is a no-op instruction. A no-op instruction is an instruction to hardware to take no operation.

In an illustrative example, an instruction to be replaced is a "touch" instruction. A touch instruction is a "hint" to the hardware to fetch the storage into "closer" memory in order to increase performance of a program. Not all older hardware supports touch instructions. In the illustrative embodiments described herein, the touch instruction is replaced with a no-op instruction. In this case, the touch instruction is not executed. The sequence of instructions is identical, but the performance will be different. Thus, by replacing the new instruction with a no-op instruction, the older hardware can still run the newer software. In this way, new instructions are inhibited from causing difficulty for the old hardware.

In a more general case, an instruction or a sequence of instructions can be replaced by a second instruction or a different sequence of instructions. The second instruction, or different sequence of instructions, need not be a no-op instruction, but can be some other instruction recognized by the older hardware or by different hardware. If multiple instructions are replaced, the instructions preferably should be executed as a single series so that code does not jump to the middle of the series. In many cases, a one-for-one instruction replacement is therefore likely.

Additional steps can be included in the illustrative method described above. For example, prior to identifying a candidate instruction, the code can be received in the data processing system. Additionally, prior to receiving the candidate instruction, the candidate instruction can be generated during compile time. At that time, the instruction can also be identified by a fix-up type associated with the candidate instruction. A fix-up type is information generated during compile time, or at some other time, that indicates to the data processing system that some instruction should be examined to determine whether or not the instruction should be substituted. Thus, a fix-up type identifies whether or not a particular instruction is a candidate for substitution. In an illustrative embodiment, the data processing system will examine each fix-up type and determine whether or not a no-op instruction is needed for that particular instruction.

Figure 3:
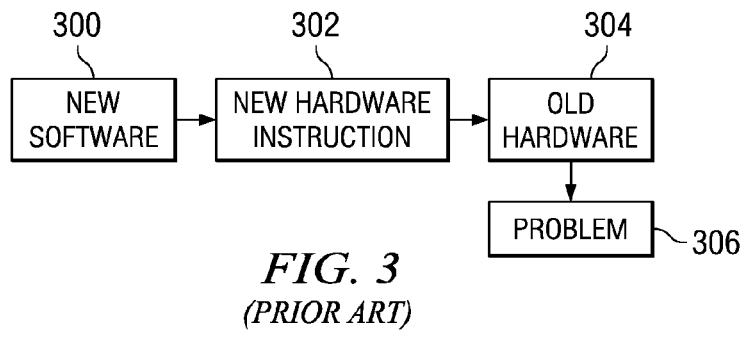
FIG. 3 is a block diagram illustrating a prior art problem that can arise when new software attempts to implement a new hardware instruction on old hardware.

FIG. 3 is a block diagram illustrating a problem that can arise when new software attempts to implement a new hardware instruction on old hardware. The block diagram shown in FIG. 3 can be implemented in a data processing system, such as data processing system 100 shown in FIG. 1 or data processing system 200 shown in FIG. 2.

In the block diagram shown in FIG. 3, new software 300 is new in the sense that the software is capable of generating instructions that are particular to a new hardware. Hardware is new if the hardware contains facilities, components, or capabilities that are relatively new relative to other hardware currently available on the market. Thus, new software 300 can generate new hardware instruction 302. New hardware instruction 302 is an instruction specifically designed for a facility of a new piece of hardware. A facility is any functionality or component of a piece of hardware.

Old hardware 304 is "old" in the sense that it is incapable of recognizing new hardware instruction 302. Thus, when new hardware instruction 302 is issued to old hardware 304, a problem 306 might arise. Problem 306 can take many forms. Problem 306 can include, but is not limited to, generation of a fault hang up of the data processing system, hang up of the hardware, hang up of the new software, incorrect implementation of the new software, or many other potential problems.

Figure 4:
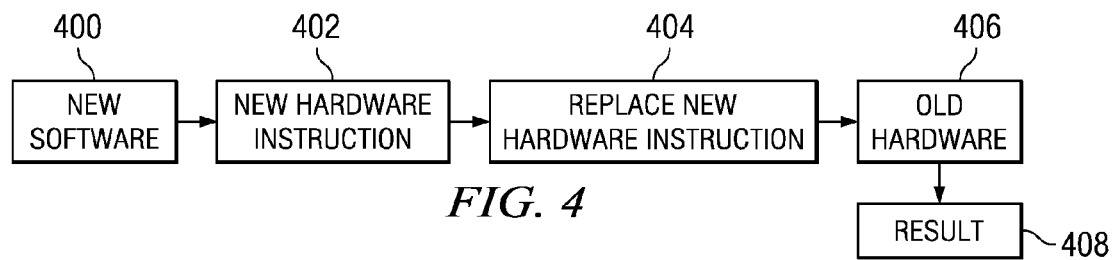
FIG. 4 is a block diagram illustrating a method of replacing a new hardware instruction with a different hardware instruction for use by old hardware, in accordance with an illustrative embodiment.

FIG. 4 is a block diagram illustrating a method of replacing a new hardware instruction with a different hardware instruction for use by old hardware, in accordance with an illustrative embodiment. The block diagram shown in FIG. 4 can be implemented in a data processing system, such as data processing system 100 in FIG. 1 or data processing system 200 in FIG. 2. Each of new software 400, new hardware instruction 402, replace new hardware instruction 404, old hardware 406, and result 408 can be implemented in such data processing systems.

The block diagram shown in FIG. 4 illustrates an improved method over the prior art method shown in FIG. 3. In the method shown in FIG. 4, new software 400 generates new hardware instruction 402. However, the data processing system replaces new hardware instruction 402 with some other additional instruction, as shown in replace new hardware instruction block 404. A replacement for new hardware instruction 402 is then transmitted to old hardware 406. The replacement for new hardware instruction 402 is in a form that can be recognized by old hardware 406. Accordingly, old hardware 406 can produce a result 408. In this manner, problem 306 shown in FIG. 3 can be avoided.

Figure 5:
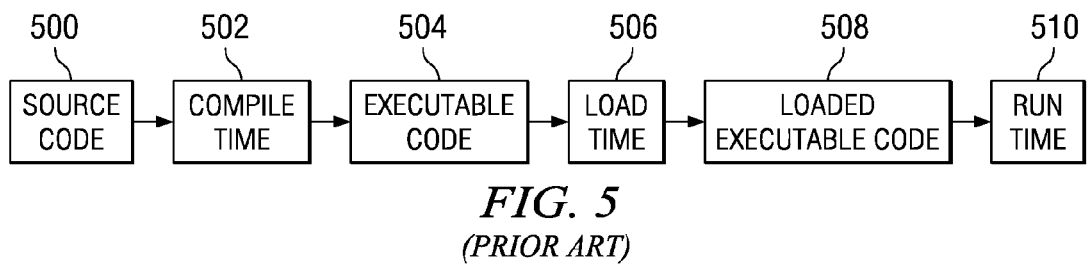
FIG. 5 is a block diagram of a prior art process of taking an application from source code to run time.

FIG. 5 is a block diagram of a prior art process of taking an application from source code to run time. The prior art method shown in FIG. 5 can be implemented in a data processing system, such as data processing system 100 of FIG. 1 or data processing system 200 of FIG. 2.

For most applications or software, the application or software is written in the form of source code 500. Source code 500 is usually drafted in a human readable computer programming language such as C, C++, Java, or many other different computer programming languages.

After writing source code 500, the software or application is compiled into a program at compile time 502. During compile time, source code 500 is converted into executable code 504. Executable code 504 is a type of code that can be easily understood and read by a machine. For example, executable code 504 could be in a machine-readable language, such as assembly language, or in some other format suitable for interpretation and execution by a data processing system, such as data processing system 100 in FIG. 1, or data processing system 200 in FIG. 2. Thus, a compiler effectively translates source code 500 into executable code 504. Most generally, a compiler translates one computer language into another computer language. Such translation may be direct, or may involve generation of an intermediate representation of the program before the executable code is generated.

After generation of executable code 504, the data processing system that will execute executable code 504 (which may be the same data processing system that generated the executable code 504, or may be a different data processing system) then loads executable code 504 so that executable code 504 can be executed. The period of time when executable code is loaded is called load time 506. After loading, executable code 504 can be referred to as loaded executable code 508. Loaded executable code 508 is loaded into a memory of the data processing system so that the data processing system can execute the software or application. The actual execution or "running" of the software or application can be referred to as run time 510.

Figure 6:
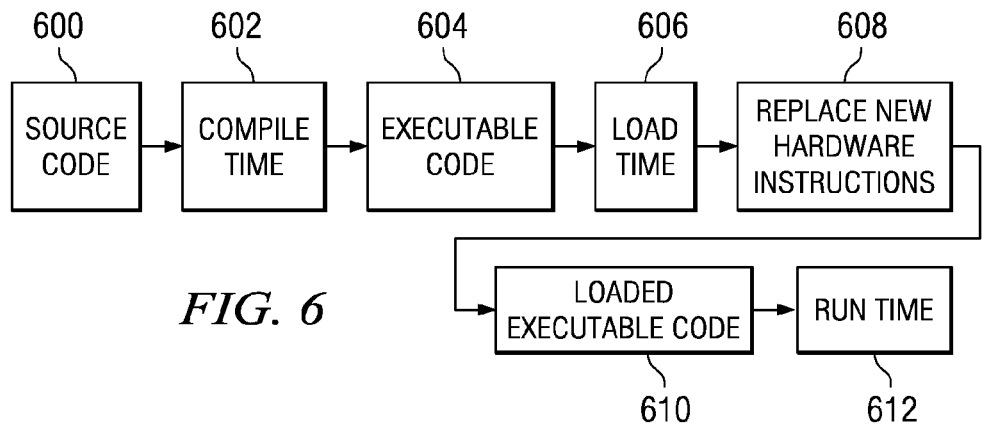
FIG. 6 is a block diagram of a process for taking an application from source code to run time, in accordance with an illustrative embodiment.

FIG. 6 is a block diagram of a process for taking an application from source code to run time, in accordance with an illustrative embodiment. The process shown in block diagram of FIG. 6 can be implemented in a data processing system, such as data processing system 100 in FIG. 1, or data processing system 200 in FIG. 2. Like the process shown in FIG. 5, the process shown in FIG. 6 takes an application or software from source code to run time.

However, the process shown in the block diagram of FIG. 6 includes replacement of instructions according to an illustrative embodiment. At first, source code 600 is compiled during compile time 602 to generate executable code 604. However, during load time 606, new hardware instructions are generated in the executable code. New hardware instructions are replaced by, or substituted with, substituted instructions at block 608. Loaded executable code 610, which includes the substituted instructions, is then executed at run time 612.

In one embodiment, to perform the replacement in block 608, a fix-up type is generated during compile time 602. A fix-up type indicates that a particular instruction is a candidate instruction for replacement. This process is described in further detail with respect to FIGS. 7-11.

The candidate instruction and the substituted instructions can be single instructions or multiple substituted instructions. Thus, a single candidate instruction can be replaced with multiple substituted instructions, or vice versa. Stated differently, the candidate instruction can be one of a single instruction and multiple instructions and the substituted set of instructions can be one of a single instruction and multiple instructions.

Figure 7:
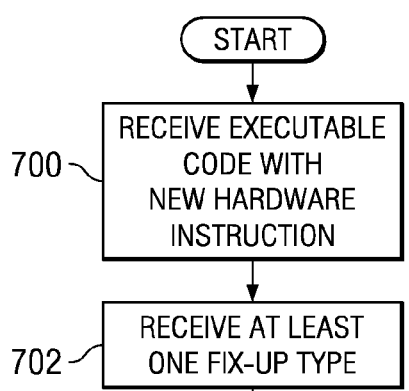
FIG. 7 is a flow chart illustrating a method of receiving new code to be implemented in old hardware, in accordance with an illustrative embodiment.

FIG. 7 is a flow chart illustrating a method of receiving new code to be implemented on old hardware, in accordance with an illustrative embodiment. The process shown in FIG. 7 can be implemented in a data processing system, such as data processing system 100 of FIG. 1 or data processing system 200 of FIG. 2. In particular, the process shown in FIG. 7 can be implemented using a processor, such as processing unit 206 shown in FIG. 2. The method shown in FIG. 7 can also be implemented using a loader in a data processing system, which may be a hardware component distinct from a central processing unit.

The process begins as executable code having a new hardware instruction is received in a data processing system (step 700). Additionally, the data processing system receives at least one fix-up type (step 702). The process then terminates.

As described above, a fix-up type is some code or indication that indicates that a particular instruction is a candidate for replacement. In an illustrative example, a fix-up type is generated by a compiler in the form of:

<NEW_INSTRUCTION opcode> <NEW_INSTRUCTION byte> <storage address>

The compiler also generates a new loader fix-up type that will define how the loader should map the NEW_INSTRUCTION instruction to a no-op instruction, if required or advantageous. In an illustrative embodiment, a fix-up type can be defined generally as:

| <replace fix-up type> | <required hardware facility> | <offset into text section> | <number of bytes to replace> |
|---|---|---|---|
| <bytes to replace> | | | |
| <replace fix-up type> | <NEW_INSTRUCTION hardware facility> | <offset to NEW_INSTRUCTION instruction> | <number of bytes in NEW_INSTRUCTION instruction> |
| <opcode for branch-never> | | | |

At load time, the loader will run through the <replace fix-up type> relocation types. For each fix-up type, the loader examines the hardware facility required or desired for the corresponding fix-up. If the loader determines that the hardware facility (in this case, the new hardware facility) is present, then the loader skips the fix-up and skips replacing instructions. If the hardware facility is not present, the loader proceeds to find the bytes to be replaced using the supplied offset and number of bytes. The loader then executes a byte replacement of the old bytes (the new instruction), with the new bytes (the no-op instruction).

The <replace fix-up type> could be compacted by organizing fix-up types by hardware facility to save space, because there could be many fix-ups required for a single load module. However, this optimization is not required.

Additionally, in an illustrative embodiment, the compiler generates a new loader fix-up type that defines how the loader should map the new instruction to a substitute instruction. In a specific illustrated embodiment, the substituted instruction is a no-op instruction. A no-op instruction is an instruction to hardware to take no action or to execute no operation. The fix-up type can take any number of different forms, such as those generally defined fix-up types, as defined above. Optionally, the fix-up types shown above can be compacted by organizing fix-up types by hardware facility to save memory space.

Figure 8:
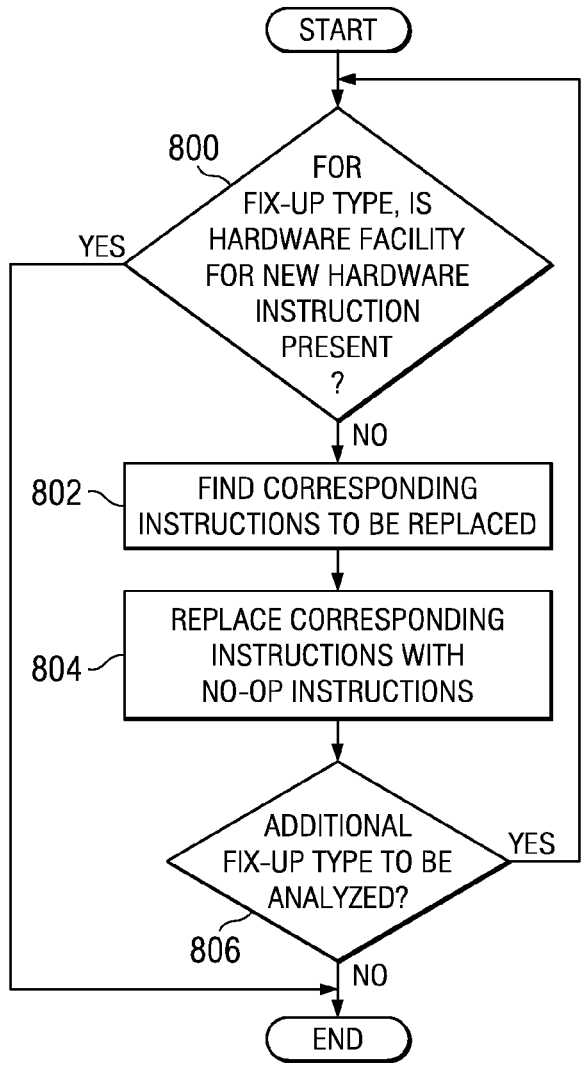
FIG. 8 is a flow chart illustrating a process for replacing a first set of instructions in an application with a second set of instructions, in accordance with an illustrative embodiment.

FIG. 8 is a flow chart illustrating a process for replacing a first set of instructions in an application with a second set of instructions, in accordance with an illustrative embodiment. The process shown in FIG. 8 can be implemented in a data processing system, such as data processing system 100 in FIG. 1, or data processing system 200 in FIG. 2. Specifically, the process shown in FIG. 8 can be implemented using a processor, such as processing unit 206 shown in FIG. 2. The method shown in FIG. 7 can also be implemented using a loader in a data processing system, which may be a hardware component distinct from a central processing unit.

The process begins as a processor determines, for a particular fix-up type, whether a hardware facility for a new hardware instruction is present (step 800). A fix-up type identifies an instruction as a candidate for replacement, as described in FIG. 7. A hardware facility is a function or a component of a piece of hardware. New hardware or old hardware is defined relative to the software or the instruction being generated. A new hardware instruction is an instruction from an application, or software, that is directed towards the hardware facility of a specific piece of new hardware.

If the hardware facility is not present, then the processor finds corresponding instructions, including bytes, to be replaced (step 802). The processor then replaces corresponding instructions or bytes to form a no-op instruction (step 804). The processor then determines whether additional fix-up types are to be analyzed (step 806). If additional fix-up types are to be analyzed, then the process returns to step 800. However, if additional fix-up types do not need to be analyzed, or if the hardware facility is present at step 800, then the process terminates.

Figure 9:
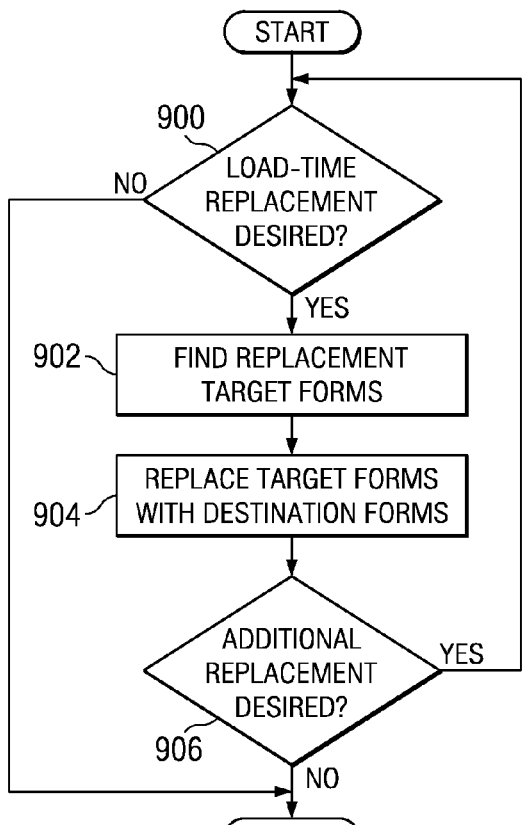
FIG. 9 is a flow chart illustrating a method of load time replacement of data, in accordance with an illustrative embodiment.

FIG. 9 is a flow chart illustrating a method of load time replacement of data, in accordance with an illustrative embodiment. The process shown in FIG. 9 can be implemented in a data processing system, such as data processing system 100 of FIG. 1, or data processing system 200 of FIG. 2. In particular, the process shown in FIG. 9 can be implemented using a processor, such as processing unit 206 as shown in FIG. 2. The method shown in FIG. 9 can also be implemented using a loader in a data processing system, which may be a hardware component distinct from a central processing unit.

The process shown in FIG. 8 can be generalized to perform different types of replacement during load time. For example, there is no known reason why the process shown in FIG. 8 should be limited to instructions. For example, the process shown in FIG. 8 can be modified to perform late mapping of data to different values, based on information that the loader could detect that the compiler could not detect. An exemplary process of this type is described with respect to FIG. 9. One possible restriction of the process shown in FIG. 9 is that new data must be the same size as the old data, because a simple replacement may occur. However, this restriction does not necessarily apply to every form of load time replacement.

The process begins as the data processing system determines whether load time replacement is desired (step 900). If load time replacement is desired, then the data processing system finds replacement target forms (step 902). A replacement target form can be any kind of indication, instruction, or code that indicates a particular mapping or instruction should be replaced with some other mapping, instruction, or equivalent structure. For example, a replacement target form can be a fix-up type as described with respect to FIG. 7, FIG. 8, and FIG. 9. If load time replacement is not desired, then the process terminates.

The process continues as the processor replaces the target forms with destination forms (step 904). The destination form is any code, instruction, or other form that indicates the new form that is to take effect. For example, a destination form could be a no-op instruction, a new data mapping, or some other replacement for the original target form. The processor then determines whether additional replacement is desired (step 906). If additional replacement is desired, the process returns to step 900. If no additional replacement is desired, the process terminates.

Figure 10:
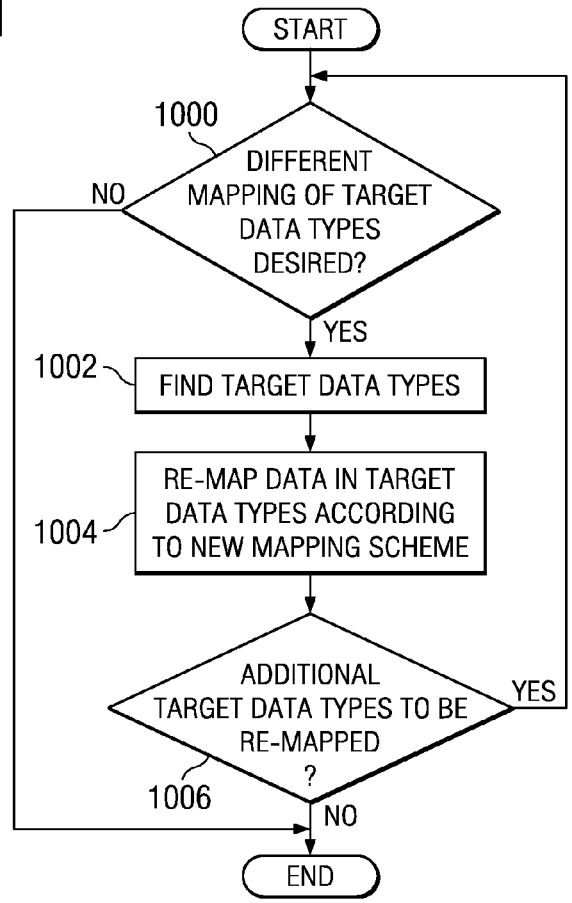
FIG. 10 is a flow chart illustrating a method for replacing a first set of instructions in an application with a second set of instructions, in accordance with an illustrative embodiment.

FIG. 10 is a flow chart illustrating a method for replacing a first set of instructions in an application with a second set of instructions, in accordance with an illustrative embodiment. The process shown in FIG. 10 can be implemented in a data processing system, such as data processing system 100 of FIG. 1, or data processing system 200 of FIG. 2. In particular, the process shown in FIG. 10 can be implemented using processing unit 206 shown in FIG. 2. The method shown in FIG. 10 can also be implemented using a loader in a data processing system, which may be a hardware component distinct from a central processing unit.

The process shown in FIG. 10 is particularly adapted towards replacement of data mappings. Thus, FIG. 10 illustrates a specific implementation of the process shown in FIG. 9. Note that the process shown in FIG. 8 is also a specific implementation of the method shown in FIG. 9.

The process begins as the processor determines if a different mapping of target data types is desired (step 1000). If different mapping is desired, the processor finds target data types (step 1002). The processor then re-maps data in the target data types according to a new mapping scheme (step 1004). A new mapping scheme is a mapping scheme that is different than the older mapping scheme. A mapping scheme is any scheme that determines how one data set is mapped to a second data set.

The processor then determines whether additional target data types are to be re-mapped (step 1006). If additional re-mapping is desired, the process then returns to step 1000. However, if additional target data types are not to be re-mapped at step 1006, or if different mapping of target data types are not desired at all at step 1000, then the process terminates.

Figure 11:
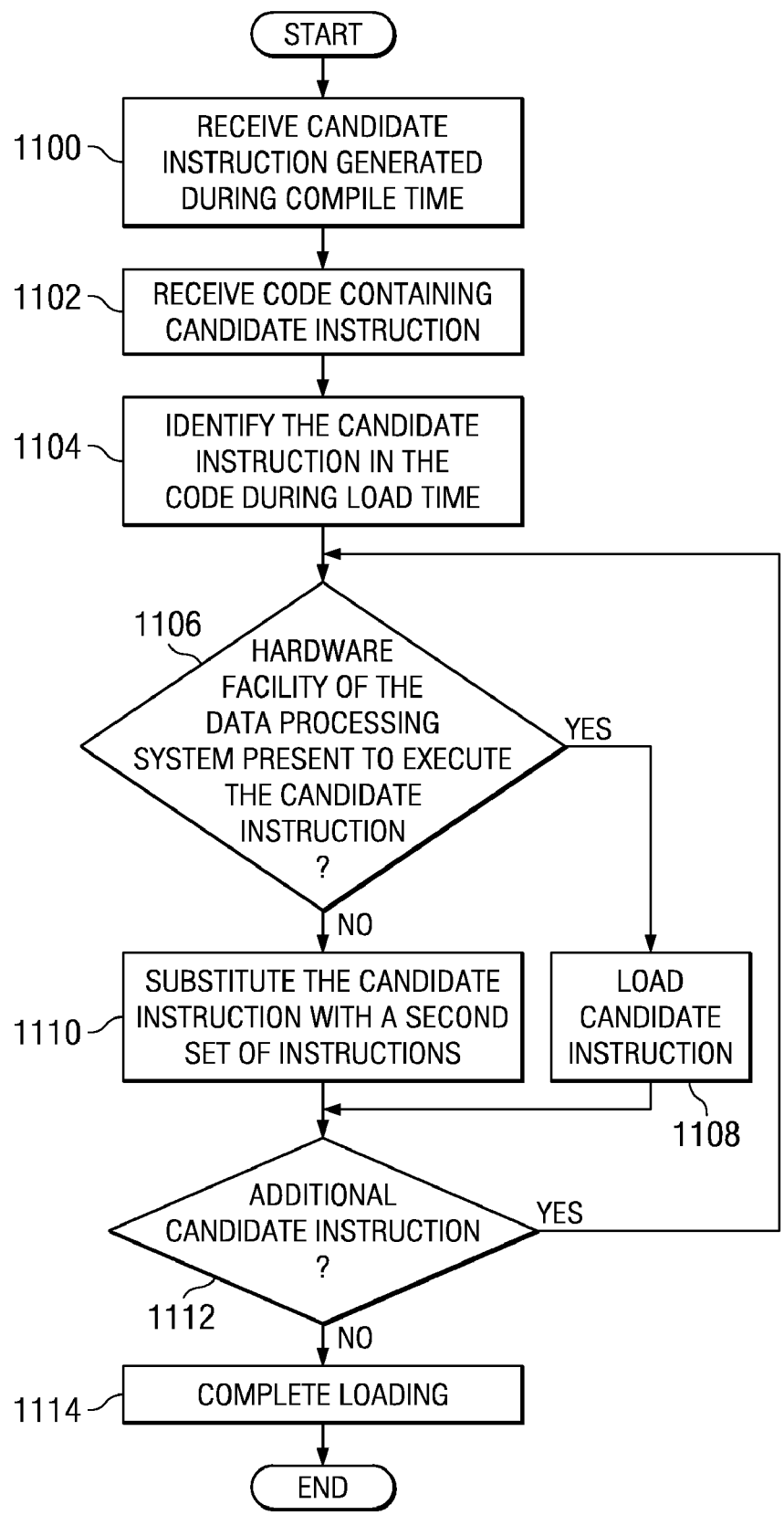
FIG. 11 is a flow chart illustrating a process for replacing a first set of instructions in an application with a second set of instructions, in accordance with an illustrative embodiment.

FIG. 11 is a flow chart illustrating a process for replacing a first set of instructions in an application with a second set of instructions, in accordance with an illustrative embodiment. The process shown in FIG. 11 can be implemented in a data processing system, such as data processing system 100 of FIG. 1 or data processing system 200 of FIG. 2. In particular, the process shown in FIG. 11 can be implemented using a processor, such as processing unit 206 shown in FIG. 2. The method shown in FIG. 11 can also be implemented using a loader in a data processing system, which may be a hardware component distinct from a central processing unit.

The process shown in FIG. 11 is a specific implementation of the process shown in FIG. 9. The process shown in FIG. 11 is also a modification of the instruction replacement method shown in FIG. 8.

The process begins as a processor receives a candidate instruction generated during compile time (step 1100). The processor then receives code containing the candidate instruction (step 1102). The processor then identifies the candidate instruction in the code during load time (step 1104). The processor makes a determination as to whether a hardware facility of the data processing system is present to execute the candidate instruction (step 1106). If the hardware facility is present in the data processing system, then the processor loads the candidate instruction for the new hardware (step 1108). The process continues at step 1112.

If the hardware facility is not present in the data processing system at step 1106, then the processor substitutes the candidate instruction with a second set of instructions (step 1110). The processor then determines whether an additional candidate instruction should be analyzed (step 1112). If an additional candidate instruction is to be analyzed, then the process returns to step 1106. However, if an additional candidate instruction is not to be analyzed, then the processor completes the loading of the application (step 1114), with the process terminating thereafter.

Thus, the illustrative embodiments described herein provide for a method, computer program product, and data processing system for replacing a candidate instruction with a second set of instructions during load time. In a specific illustrated example, a method can be characterized by identifying a candidate instruction in a code of an application being loaded during load time. Responsive to identifying a candidate instruction, a determination is made as to whether a hardware facility in the data processing system is present to execute the candidate instruction. Responsive to a determination that the hardware facility is absent from the data processing system, the candidate instruction is substituted with a second set of instructions.

Thus, the illustrative examples described herein provide a means for replacing instructions intended for new hardware facilities with instructions that are compatible with old hardware. Although one illustrative embodiment described herein replaces new hardware facility instructions with no-op instructions, different instructions could also be substituted for execution by old hardware. Nevertheless, the no-op instruction can be recognized by nearly all forms of old hardware.

Thus, the illustrative examples described herein also provide a means for allowing new software applications to be implemented on old hardware. As described above, the solution can be generalized to perform other forms of load time replacement. For example, one form of data mapping can be converted into another form of data mapping during load time. In another illustrative example, a first library could be replaced by a second library. Other forms of replacement can be performed at load time.

Stated differently, the illustrated embodiments provide for a method of replacing one form of instructions with another form of instructions at load time using a fix-up. At load time, the loader will run though pre-defined fix-up types. If the loader determines the corresponding new hardware facility is present, then the loader skips the fix-up or skips the instruction substitution. If the hardware facility is not present, then the loader proceeds to find the instructions or bytes to be replaced using the supplied offset and number of instructions or bytes. The loader then performs a replacement of the old instructions or bytes with the new instructions or bytes.

In a preferred embodiment, the invention is implemented in software, which includes, but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method implemented in a data processing system, the method comprising:
    identifying a candidate instruction in a code of an application being loaded during load time, wherein the candidate instruction is a touch instruction specific to a hardware facility directing the hardware facility to fetch storage into memory;
    responsive to identifying the candidate instruction, determining whether the hardware facility is present in the data processing system to execute the candidate instruction; and
    responsive to a determination that the hardware facility is absent from the data processing system, substituting the candidate instruction with a second set of instructions, wherein the second set of instructions is a set of no-op instructions, and wherein the touch instruction is not executed during runtime.

2. The method of claim 1 further comprising:
    responsive to a determination that the hardware facility is present in the data processing system, retaining the candidate instruction.

3. The method of claim 1 wherein the candidate instruction is one of a single instruction and a plurality of instructions.

4. The method of claim 1 wherein the second set of instructions is one of a single instruction and a plurality of instructions.

5. The method of claim 1 wherein the candidate instruction is one of a single instruction and a plurality of instructions and wherein the second set of instructions is one of a single instruction and a plurality of instructions.

6. The method of claim 1 wherein the candidate instruction is identified by a fix-up type associated with the candidate instruction.

* * * * *